June 23, 1925.  1,542,832
E. T. PARSONS ET AL
DOUGH MOLDING MACHINE
Filed July 19, 1923  4 Sheets-Sheet 1
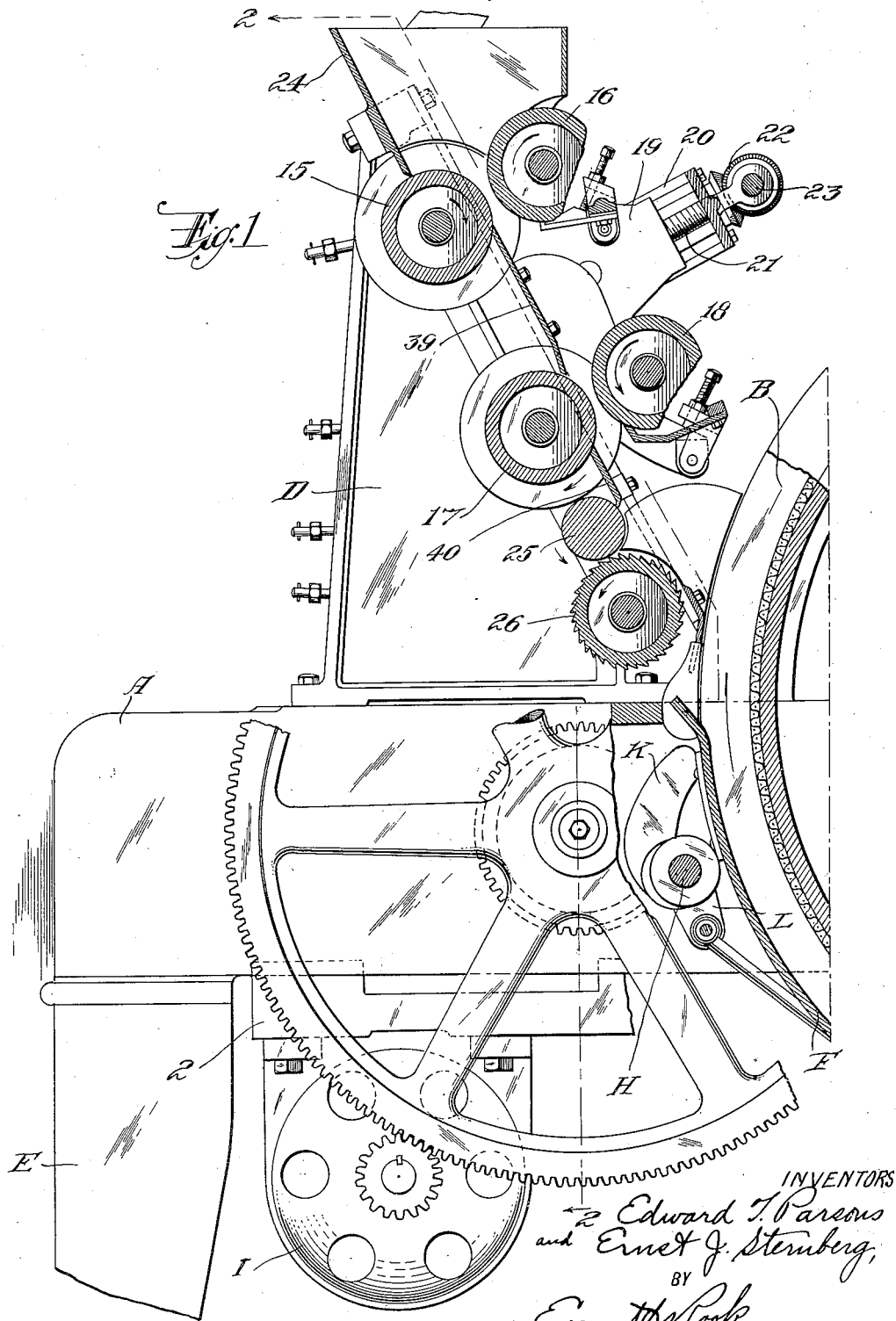

June 23, 1925.
E. T. PARSONS ET AL
DOUGH MOLDING MACHINE
Filed July 19, 1923
1,542,832
4 Sheets-Sheet 2
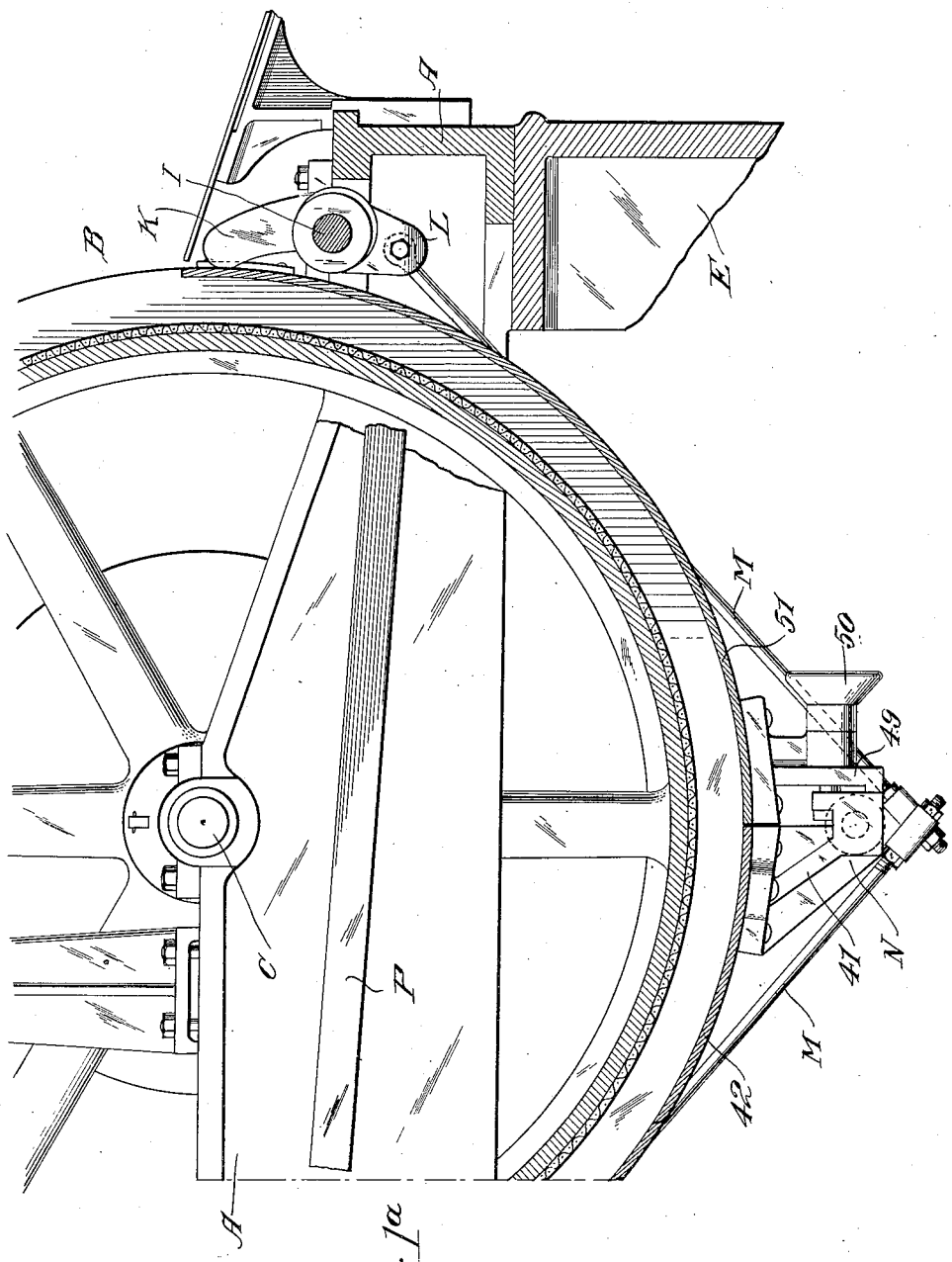
INVENTORS.
Edward T. Parsons
and Ernst J. Stemberg,
BY Everett Rook,
ATTORNEYS.

June 23, 1925.
E. T. PARSONS ET AL
DOUGH MOLDING MACHINE
Filed July 19, 1923
1,542,832
4 Sheets-Sheet 3
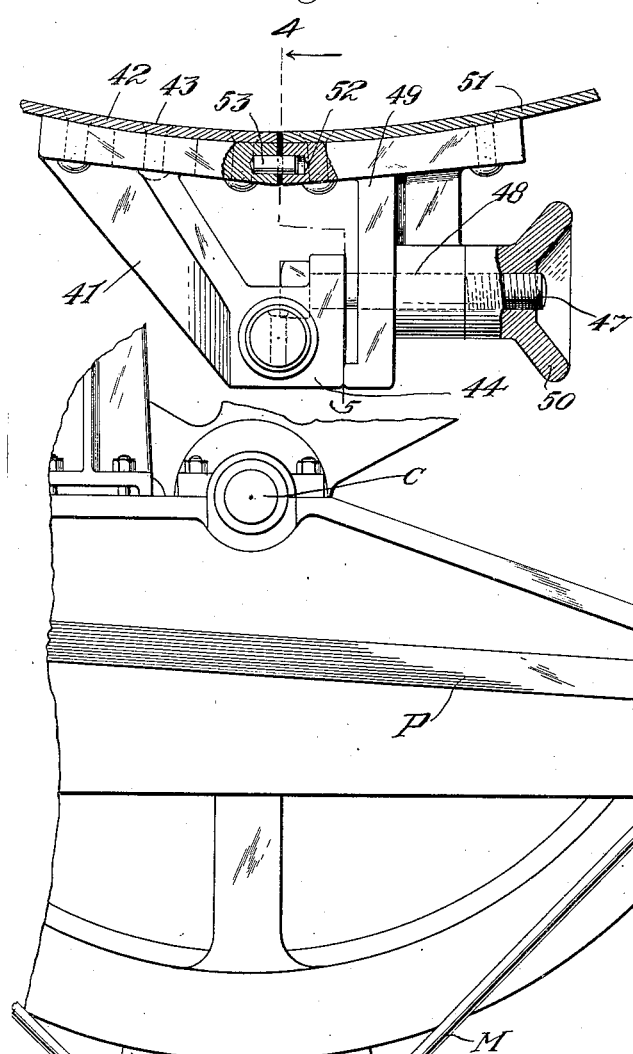
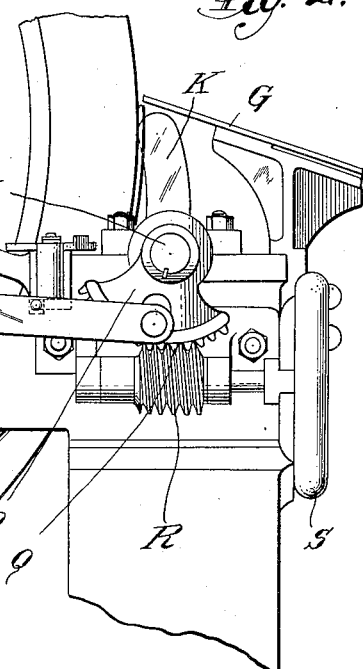
INVENTORS
Edward T. Parsons
and Ernst J. Sternberg,
BY 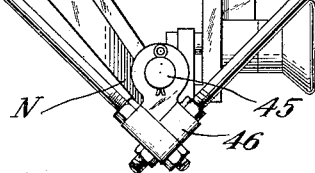 ATTORNEYS.

June 23, 1925. 1,542,832
E. T. PARSONS ET AL
DOUGH MOLDING MACHINE
Filed July 19, 1923 4 Sheets-Sheet 4
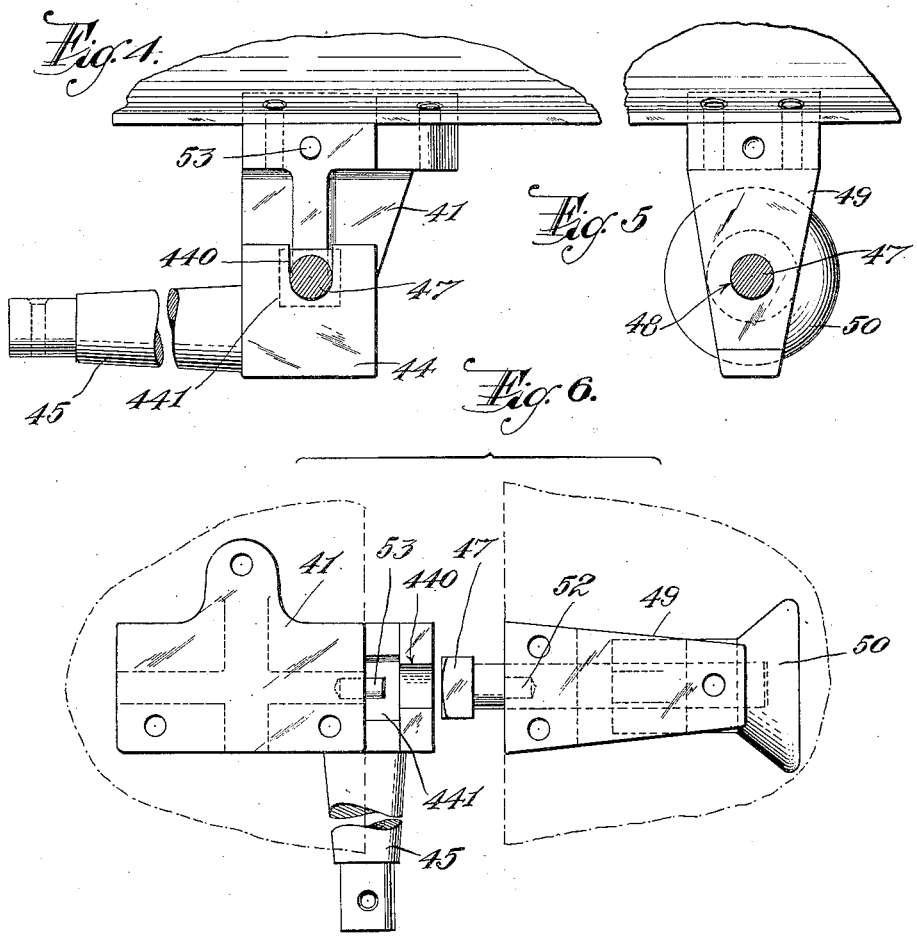
INVENTORS
Edward T. Parsons
and Ernst J. Sternberg,
BY Everett W. Cook, ATTORNEYS Patented June 23, 1925.

1,542,832

UNITED STATES PATENT OFFICE.

EDWARD T. PARSONS, OF NEWARK, AND ERNST J. STERNBERG, OF LYONS FARMS, NEW JERSEY, ASSIGNORS TO THOMSON MACHINE COMPANY, A CORPORATION OF NEW JERSEY.

DOUGH-MOLDING MACHINE.

Application filed July 19, 1923. Serial No. 652,477.

*To all whom it may concern:*

Be it known that we, EDWARD T. PARSONS and ERNST J. STERNBERG, both citizens of the United States, and residents, respectively, of Newark, in the county of Essex and State of New Jersey, and Lyons Farms, in the county of Union and State of New Jersey, have invented new and useful Improvements in Dough-Molding Machines, of which the following is a specification.

This invention relates in general to a dough molding machine of the type described in United States Patent No. 701,646 to C. A. Thomson, June 3, 1902, in which a ball or lump of dough is first rolled between driven rollers into a thin sheet which is subsequently automatically spirally rolled to form a substantially cylindrical loaf, said loaf being then subjected to a rolling and squeezing pressure between a rotating drum and a semi-circular compression plate to knead or work the dough into proper condition for the pan.

In this type of machine the compression plate has been made of a single sheet of metal curved longitudinally to surround the lower half of the kneading drum and it is difficult to apply and remove this plate from the machine.

One object of the invention is to provide a novel and improved sectional compression plate for dough molding machines of the character described which can be easily and quickly applied to and removed from the machine.

Other objects are to provide a compression plate of the character described comprising a plurality of arcuate sections and novel and improved means for separably connecting the ends of said sections; to provide such connecting means also formed to be connected to means for moving the compression plate toward and from said drum, and to obtain other results and advantages as may be brought out by the following description.

Referring to the accompanying drawings, in which like numerals of reference indicate the same parts throughout the several views.

Figure 1 is a vertical longitudinal sectional view, partially in side elevation, of the driving and dough sheeting end of the machine, portions being broken away for clearness of illustration;

Figure 1ª is a similar view through the loaf kneading end of the machine, portions of the drum being broken away;

Figure 2 is a fragmentary side elevation of the loaf kneading end of the machine showing the compression plate operating mechanism;

Figure 3 is an enlarged detail section and side elevation of the means for securing the two sections of the compression plate together;

Figure 4 is a sectional view taken on the line 4—5 of Fig. 3, looking in one direction;

Figure 5 is a similar view taken on the line 4—5, of Fig. 3, looking in the opposite direction, and Figure 6 is a top plan view of the connecting means for the two sections of the compression plate separated from each other.

Referring particularly to Figures 1, 1ª, 2 and 3 of the drawings, the reference character A designates the main frame of the machine on one end of which is journaled a kneading drum B on a transverse shaft C, one side of said drum being positioned adjacent a dough sheeting and loaf forming mechanism D mounted at the end of the frame opposite the drum. The main frame A is supported by legs or standards E, and the frame of the dough sheeting and loaf forming mechanism D is superposed upon the main frame.

The said dough sheeting and loaf forming mechanism includes two pairs of sheeting rollers 15, 16 and 17, 18 longitudinally spaced on the frame of the mechanism D. One of the rollers of each of said pairs, in the present instance the rollers 16 and 18 are adjustable toward and away from the corresponding rollers 15 and 17 by means of suitable known adjusting mechanism including a slide 19 carrying the rollers 16 and 18 and slidably mounted in guideways 20 at opposite sides of the machine, said slides 19 being adjustable in the guideways 20 by means of screws 21 rotated through bevel gears 22 and an actuating shaft 23. A hopper 24 is arranged above the uppermost sheeting rollers 15, 16 to receive a lump or ball of dough and guide the same between the sheeting rollers. All of said rollers 15, 16 and 17, 18 are intergeared and driven together from a motor 1 by any suitable means in the direction indicated by the arrows so as to force the dough between the rollers of each pair. The dough passing between the said rollers is formed into a sheet and then is operated upon by a curling and loaf forming mechanism which spirally rolls the sheet into a substantially cylindrical loaf.

This loaf forming mechanism includes a smooth roller 25 arranged beneath the lower part of sheeting rollers 17, 18, and a fluted roller 26 arranged beneath the smooth roller 25 and adjacent the drum B. The loaf forming mechanism and the drum B, are driven through suitable gearing (not shown) from a motor 1.

A compression plate F formed of sheet metal surrounds the lower half of the kneading drum B in spaced relation thereto to form a channel between said drum and the compression plate. The loaf formed by the curling roller 26 is deposited by action of gravity into said channel and rolled with a squeezing pressure between the drum and the compression plate to the opposite side of the drum, whereby the loaf is properly kneaded and worked into a condition for panning. The loaf is then deposited by action of gravity onto a discharge plate G or other suitable means for receiving the loaf. The pressure on the loaf as it passes through said channel is adjusted by means of two rock shafts H and I mounted at opposite sides of the drum and each carrying a pair of arms K bearing against the ends of the compression plate. The said shafts also carry crank arms L which are connected by links M to bearing members N secured to the compression plate on substantially the vertical diametric line of the drum. Each of the rock shafts H and I also carries a crank arm O, said crank arms being connected by a link P whereby the rock shafts may oscillate simultaneously. One of said crank arms is preferably in the form of a worm gear segment Q which meshes with a worm R rotatable by a hand wheel S. With this construction when the hand wheel S is rotated in either direction the rock shafts H and I are simultaneously oscillated in opposite directions to exert or release pressure through the arms K on the ends of the compression plate F. At the same time pressure is applied to or released from the center of the compression plate by means of the links M and bearing members N. This adjusting mechanism of the compression plate is all broadly old.

In accordance with the invention, the compression plate is formed in two sections connected together at substantially the vertical diametric line of the drum by means which also serve to perform the functions of the bearing members N, as shown on Figs. 1ª, and 2—6 inclusive. This connecting means includes a section 41 adapted to be rigidly secured to one end of one of the compression plate sections 42 by any suitable means such as rivets 43, said section including a head 44 having a laterally projecting trunnion 45 to pivotally receive a hanger 46 connected to the link M. The said head 44 is provided in its top surface with a notch 440 and a recess 441 to receive the head of a bolt 47 loosely passing through a corresponding opening 48 in the other section 49 of the connecting means, said bolt having threaded thereon a clamping nut 50 whereby the two sections 41 and 49 may be secured together. The section 49 is rigidly connected to the end of the other section 51 of the compression plate and is provided with an opening 52 to receive a dowel pin 53 projecting from the adjacent face of the section 41. It will be observed that the tension exerted on the bolt 47 by means of the nut 50 is substantially longitudinal of the compression plate so that when the dowel pin 53 is fitted into the opening 52 and the nut 50 tightened, the two sections 42 and 51 of the compression plate will be rigidly connected. To separate the sections 42 and 51 it is merely necessary to loosen the nut 50, slide the sections 42 and 51 of the compression plate longitudinally apart and raise the end of the section 51 to cause the head of the bolt 47 to clear the notch 440 and recess 441, whereby the sections 41 and 49 of the connecting means are disconnected. It will be understood that there is one of said connecting means at each side of the compression plate with the trunnion 45 thereof preferably projecting outwardly to receive the hanger 46.

While we have shown and described certain preferred details of construction for carrying out our invention, it will be understood that this is mainly for the purpose of illustrating the principles of the invention and that many modifications and changes can be made in the details of construction without departing from the spirit or scope of the invention. Therefore, we do not wish to be understood as restricting ourselves except as required by the following claims when construed in the light of the prior art.

Having thus described the invention, what we claim is:

1. In a dough molding machine, the combination with a kneading drum and means for driving the same, of a compression plate surrounding a portion of the periphery of said drum in spaced relation thereto, said compression plate being formed in a plurality of complimental arcuate sections, means for separably connecting said sections, and means for adjusting said plate toward and from the periphery of said drum.

2. In a dough molding machine, the combination with a kneading drum and means for driving the same, of a compression plate surrounding a portion of the periphery of said drum in spaced relation thereto, means for adjusting said plate toward and from the periphery of said drum, said compression plate being formed of a plurality of arcuate sections, and means for separably connecting said sections and formed to be connected to said means for adjusting said plate.

3. In a dough molding machine, the combination with a kneading drum and means for driving the same, of a compression plate surrounding a portion of the periphery of said drum in spaced relation thereto, said compression plate being formed in a plurality of arcuate sections, cooperating members on the meeting ends of adjacent ones of said sections for separably connecting the latter, and means for adjusting said plate toward and from the periphery of said drum.

4. In a dough molding machine, the combination with a kneading drum and means for driving the same, of a compression plate surrounding a portion of the periphery of said drum in spaced relation thereto, said compression plate being formed in a plurality of arcuate sections, cooperating members on the meeting ends of adjacent ones of said sections for separably connecting the latter, and means including devices connected to said connecting members for adjusting said plate toward and from the periphery of said drum.

5. In a dough molding machine, the combination with a kneading drum and means for driving the same, of a compression plate surrounding a portion of the periphery of said drum in spaced relation thereto, said compression plate being formed in a plurality of arcuate sections, a connecting means including two members one secured to the meeting edge of each of two adjacent sections of said plate, one of said members having a laterally projecting trunnion, means for separably connecting said members, and means including a device pivotally connected to said trunnion for adjusting said plate toward and from the periphery of said drum.

6. In a dough molding machine, the combination with a kneading drum and means for driving the same, of a compression plate surrounding a portion of the periphery of said drum in spaced relation thereto, said compression plate being formed in a plurality of arcuate sections, cooperating members on the meeting ends of adjacent ones of said sections for separably connecting the latter, one of said members carrying a bolt and a nut and the other having a recess to separably receive the head of said bolt for connecting said members, and means for adjusting said plate toward and from the periphery of said drum.

7. In a dough molding machine, the combination with a kneading drum and means for driving the same, of a compression plate surrounding a portion of the periphery of said drum in spaced relation thereto, said compression plate being formed in a plurality of arcuate sections, cooperating members on the meeting ends of adjacent ones of said sections for separably connecting the latter, one of said members carrying a bolt and a nut, the head of said bolt projecting from the face of said member adjacent the other of said members and said nut bearing against the opposite face, the other of said members being formed with a recess to receive said head of said bolt to connect said members when said nut is tightened, and means for adjusting said plate toward and from the periphery of said drum.

EDWARD T. PARSONS.
ERNST J. STERNBERG.